United States Patent
Hirowatari

(10) Patent No.: US 8,631,641 B2
(45) Date of Patent: Jan. 21, 2014

(54) CONTROL DEVICE FOR VEHICLE

(75) Inventor: Seiji Hirowatari, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 515 days.

(21) Appl. No.: 12/990,928

(22) PCT Filed: Nov. 27, 2009

(86) PCT No.: PCT/JP2009/070034
§ 371 (c)(1),
(2), (4) Date: Nov. 3, 2010

(87) PCT Pub. No.: WO2010/073876
PCT Pub. Date: Jul. 1, 2010

(65) Prior Publication Data
US 2011/0056189 A1   Mar. 10, 2011

(30) Foreign Application Priority Data
Dec. 24, 2008   (JP) ................. 2008-327235

(51) Int. Cl.
*F01N 3/20* (2006.01)
*F02D 41/14* (2006.01)
*F02D 45/00* (2006.01)

(52) U.S. Cl.
USPC ............................................. 60/284; 60/285

(58) Field of Classification Search
USPC .................................................. 60/284, 285
See application file for complete search history.

(56) References Cited

U.S. PATENT DOCUMENTS

| | | |
|---|---|---|
| 6,810,858 B2 | 11/2004 | Ito et al. |
| 7,024,851 B2 | 4/2006 | Akagi et al. |
| 7,412,821 B2 | 8/2008 | Araki et al. |
| 7,599,787 B2 | 10/2009 | Hokuto et al. |
| 8,113,186 B2 | 2/2012 | Tsunooka et al. |
| 2004/0074773 A1* | 4/2004 | Niwa ............................ 204/425 |
| 2004/0099252 A1 | 5/2004 | Nagaishi et al. |
| 2007/0017213 A1 | 1/2007 | Katou |

FOREIGN PATENT DOCUMENTS

| | | |
|---|---|---|
| DE | 11 2008 000 445 | 12/2009 |
| EP | 1 584 807 A2 | 10/2005 |
| FR | 2843422 A1 | 2/2004 |

(Continued)

OTHER PUBLICATIONS

European Office Action issued in European Application No. 09834680.2 dated May 16, 2011.

*Primary Examiner* — Thomas Denion
*Assistant Examiner* — Brandon Lee
(74) *Attorney, Agent, or Firm* — Sughrue Mion, PLLC

(57) ABSTRACT

In a vehicle having mounted therein an engine including an injector that directly injects fuel into a cylinder, in the case in which a warm-up control required condition is established, catalyst warm-up control is executed if an amount of fuel diluted in oil is low, or even if the amount of fuel diluted in oil is high, when the temperature of the engine oil is less than the fuel volatilization temperature. In contrast, even in the case in which the warm-up control required condition is established, if the amount of fuel diluted in oil is greater than or equal to a determination value, and furthermore the temperature of the engine oil is greater than or equal to the fuel volatilization temperature, there is the possibility of negative influence on exhaust emissions, and therefore the catalyst warm-up control is prohibited.

7 Claims, 4 Drawing Sheets

(56) References Cited

FOREIGN PATENT DOCUMENTS

| | | |
|---|---|---|
| JP | 2003-322044 A | 11/2003 |
| JP | 2004-197591 A | 7/2004 |
| JP | 2005-133579 A | 5/2005 |
| JP | 2006-258027 A | 9/2006 |
| JP | 2006-274949 A | 10/2006 |
| JP | 2006-299931 A | 11/2006 |
| JP | 2007-32316 A | 2/2007 |
| JP | 2007-71121 A | 3/2007 |
| JP | 2007-9845 A | 11/2007 |
| JP | 2008-19792 A | 1/2008 |
| JP | 2009-36044 A | 2/2009 |
| JP | 4631860 B2 | 2/2011 |
| JP | 4742721 B2 | 8/2011 |
| WO | 2008/102633 A1 | 8/2008 |

* cited by examiner

CONTROL DEVICE FOR VEHICLE

TECHNICAL FIELD

The present invention relates to a control device for a vehicle in which an internal combustion engine (hereinafter, also called the "engine") is mounted, and more specifically relates to a control device for a vehicle in which warm-up control is performed on a catalyst disposed in an exhaust passage of the engine.

BACKGROUND ART

Examples of an engine mounted in a vehicle include a port injection engine in which fuel is injected from an injector into an intake passage or an intake port, and an in-cylinder direct injection engine in which fuel is directly injected from an injector into a cylinder (into a combustion chamber). Also, there is known a so-called dual injection type of engine including an injector for in-cylinder injection that injects fuel into a cylinder (into a combustion chamber), and an injector for intake port injection that injects fuel into an intake passage or an intake port.

In an engine mounted in a vehicle, blow-by gas (an uncombusted mixture of air and fuel, and combustion gas) leaks from a combustion chamber into a crankcase through a gap between a piston and the wall surface of a cylinder. Blow-by gas cannot be expelled into the atmosphere due to containing a large amount of hydrocarbons (HC), oil components (engine oil mist), and the like. For this reason, the engine is equipped with a blow-by gas reducing device (PCV (Positive Crankcase Ventilation) device) that returns blow-by gas that has leaked into the crankcase back to an intake passage through a blow-by gas passage (e.g., see Patent Literature 1).

Meanwhile, a catalyst (e.g., a three-way catalyst) that removes hazardous components (HC, CO, NOx, and the like) contained in exhaust gas discharged from a combustion chamber is disposed in an exhaust passage of an engine, and catalyst warm-up control for raising the temperature of the catalyst early is performed. For example, in a vehicle in which an in-cylinder direct injection gasoline engine (or a dual injection type of engine) is mounted, the temperature of exhaust gas discharged from a combustion chamber is raised by setting the fuel injection timing to the latter stage of the compression stroke to cause the combustion state to be stratified combustion (or weak stratified combustion), and furthermore retarding the ignition timing of ignition by a spark plug, thus accelerating the warm-up of the catalyst (e.g., see Patent Literature 2 and 3).

CITATION LIST

Patent Literature

PTL 1: JP 2006-299931A
PTL 2: JP 2006-274949A
PTL 3: JP 2006-258027A

SUMMARY OF INVENTION

Technical Problem

In an engine mounted in a vehicle, however, dilution with fuel occurs in which fuel mixes in with engine oil. As the temperature of the engine oil increases, the dilution fuel accumulated in the engine oil volatilizes (evaporates) in the crankcase. The volatilized fuel enters the intake passage through the blow-by gas passage, and therefore the engine air-fuel ratio becomes rich. Although such a situation normally has little influence even if it occurs since air-fuel ratio feedback control (hereinafter, also called the "A/F feedback control") is executed, there are cases in which a problem arises when catalyst warm-up control is performed in an in-cylinder direct injection engine (or a dual injection type of engine). Specifically, stratified combustion (or weak stratified combustion) is being performed as described above when catalyst warm-up control is performed in an in-cylinder direct injection engine (or a dual injection type of engine), and therefore the A/F feedback control is not executed in view of the difficulty in terms of spray formation. For this reason, when the engine air-fuel ratio becomes rich when catalyst warm-up control is performed, there are cases in which drivability and exhaust emissions degrade.

The present invention has been achieved in consideration of such a circumstance, and an object thereof is to realize control that can improve drivability and exhaust emissions in a control device for an automobile having mounted therein an in-cylinder direct injection engine (or a dual injection type of engine) including an injector that directly injects fuel into a cylinder.

Solution to Problem

The present invention is premised on a control device that is applied to a vehicle including an internal combustion engine (engine), an injector that directly injects fuel into a combustion chamber of the internal combustion engine, and a catalyst disposed in an exhaust passage of the internal combustion engine, and that performs warm-up control on the catalyst. Also, a technical feature is that such a control device for a vehicle includes: a dilution fuel amount recognizing unit that recognizes a value related to an amount of fuel diluted in oil, contained in engine oil diluted by fuel; an oil temperature recognizing unit that recognizes a value related to a temperature of the engine oil; and a controlling unit that, in a case in which a warm-up control required condition is established, executes catalyst warm-up control, conditional on the value related to the amount of fuel diluted in oil being less than a determination value, or the value related to the temperature of the engine oil being less than a determination value, and that, even in a case in which the warm-up control required condition is established, prohibits the catalyst warm-up control if the value related to the amount of fuel diluted in oil is greater than or equal to the determination value, and furthermore the value related to the temperature of the engine oil is greater than or equal to the determination value.

Note that in the present invention, the value related to the amount of fuel diluted in oil may be, besides the amount of fuel diluted in oil itself, for example a degree of oil dilution (dilution rate). Also, the value related to the temperature of the engine oil may be, besides the temperature of the engine oil itself, for example an engine water temperature, which is correlated with the temperature of the engine oil.

In the present invention, a configuration may be employed in which an air-fuel ratio sensor disposed in the exhaust passage of the internal combustion engine, and a determining unit that determines whether the air-fuel ratio sensor is in an active state are provided, and in a case in which the catalyst warm-up control has been prohibited, air-fuel ratio feedback control is executed, conditional on the air-fuel ratio sensor being in the active state.

In the present invention, one example of the warm-up control required condition is that "an integrated intake air volume since a time of engine starting is less than a determination value".

Next is a description of a principle of a solution of the present invention.

First, as described above, if the dilution fuel accumulated in the engine oil has volatilized in the crankcase, the volatilized fuel flows into the intake passage through the blow-by gas passage. However, if the amount of fuel diluted in oil is sufficiently low, the amount of fuel that volatilizes in the crankcase is low, and therefore a situation in which exhaust emissions are negatively influenced does not occur. Also, even if the amount of fuel diluted in oil is high, when the temperature of the engine oil is low (specifically, when the temperature of the engine oil is less than the volatilization temperature of the fuel), the fuel does not readily volatilize in the crankcase (or fuel volatilization does not occur), and therefore the situation in which exhaust emissions are negatively influenced does not occur in this case either.

Focusing on this point, in the present invention, in the case in which the warm-up control required condition is established, if the amount of fuel diluted in oil is less than a predetermined determination value, that is to say, if the amount of fuel diluted in oil is low enough to not negatively influence exhaust emissions, the catalyst warm-up control is executed, thus accelerating the warm-up of the catalyst. Also, even if the amount of fuel diluted in oil is high, when the situation is such that the temperature of the engine oil is less than a predetermined determination value and the dilution fuel does not readily volatilize, the catalyst warm-up control is executed, thus accelerating the warm-up of the catalyst.

In contrast, even in the case in which the warm-up control required condition is established, if the amount of fuel diluted in oil is greater than or equal to the determination value, and furthermore the temperature of the engine oil is greater than or equal to the determination value, there is the possibility of the engine air-fuel ratio becoming rich and negatively influencing the exhaust emissions, and therefore the catalyst warm-up control is prohibited. In this way, if the amount of fuel diluted in oil is high, the catalyst warm-up control is prohibited when the temperature of the engine oil is in a high region (volatilization temperature region), and the execution of the A/F feedback control is enabled, thereby making it possible to improve drivability and exhaust emissions.

Note that similar effects to those above can be achieved even if the execution/prohibition of the catalyst warm-up control is determined with use of another value related to the amount of fuel diluted in oil (e.g., a degree of oil dilution (dilution rate)). Also, similar effects to those above can be achieved even if the execution/prohibition of the catalyst warm-up control is determined with use of another value related to the temperature of the engine oil (e.g., an engine water temperature).

In the present invention, in the case of using the temperature of the engine oil itself in determining the execution/prohibition of the catalyst warm-up control, if the temperature of the engine oil being less than the volatilization temperature of the fuel is set as a condition for executing the catalyst warm-up control, the catalyst warm-up control can be performed in a situation in which the volatilization of dilution fuel in the crankcase does not hardly occur, thereby more effectively improving exhaust emissions.

Here, the above-described prohibition of the catalyst warm-up control is preferably limited to the case in which an improvement in exhaust emissions can be anticipated. In order to realize this, it is necessary for the prohibition of the catalyst warm-up control to be limited to the state in which the air-fuel ratio sensor is active and the air-fuel ratio feedback control can be executed. In view of this, in the present invention, in the case in which the warm-up control required condition is established, the determination as to whether a condition is established, the condition being that the value related to the amount of fuel diluted in oil is less than the determination value or the value related to the engine oil temperature is less than the volatilization temperature, is made only if the air-fuel ratio sensor is in the active state.

Specifically, a determining unit is provided that determines whether the air-fuel sensor disposed in the exhaust passage of the internal combustion engine is in the active state, and in a case in which the warm-up control required condition is established, the catalyst warm-up control is executed if the air-fuel ratio sensor is in an inactive state. Also, in a case in which the warm-up control required condition is established, the catalyst warm-up control is executed if the air-fuel ratio sensor is in the active state, conditional on the value related to the amount of fuel diluted in oil being less than the determination value, or the value related to the temperature of the engine oil being less than the determination value. On the other hand, in a case in which the warm-up control required condition is established and the air-fuel ratio sensor is in the active state, the catalyst warm-up control is prohibited if the value related to the amount of fuel diluted in oil is greater than or equal to the determination value, and furthermore the value related to the temperature of the engine oil is greater than or equal to the determination value.

Employing such a configuration enables more effectively improving drivability and exhaust emissions. Note that in such a configuration, a configuration may be employed in which in a case in which the catalyst warm-up control has been prohibited due to, for example, the warm-up control required condition not being established, the air-fuel ratio feedback control is executed, conditional on the air-fuel ratio sensor being in the active state.

Advantageous Effects of Invention

According to the present invention, even in the case in which a warm-up control required condition is established, if the amount of fuel diluted in oil is greater than or equal to a determination value, and furthermore the temperature of the engine oil is greater than or equal to a determination value, the catalyst warm-up control is prohibited, thus enabling improving drivability and exhaust emissions.

DESCRIPTION OF EMBODIMENTS

Below is a description of embodiments of the present invention based on the drawings.

Embodiment 1

Figure 1:
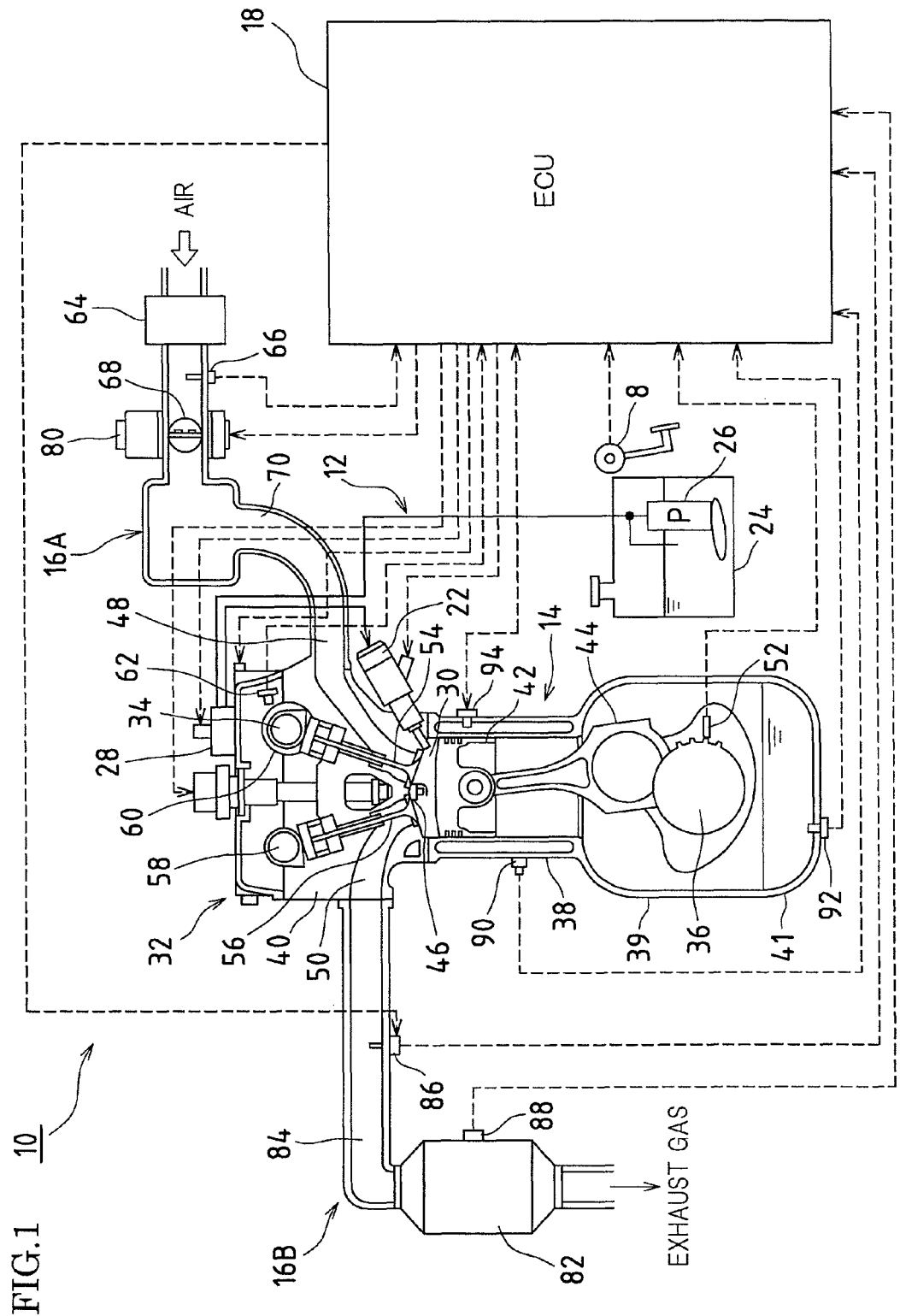
FIG. 1 is a schematic configuration diagram showing an example of an in-cylinder direct injection engine mounted in a vehicle to which the present invention is applied.
Figure 2:
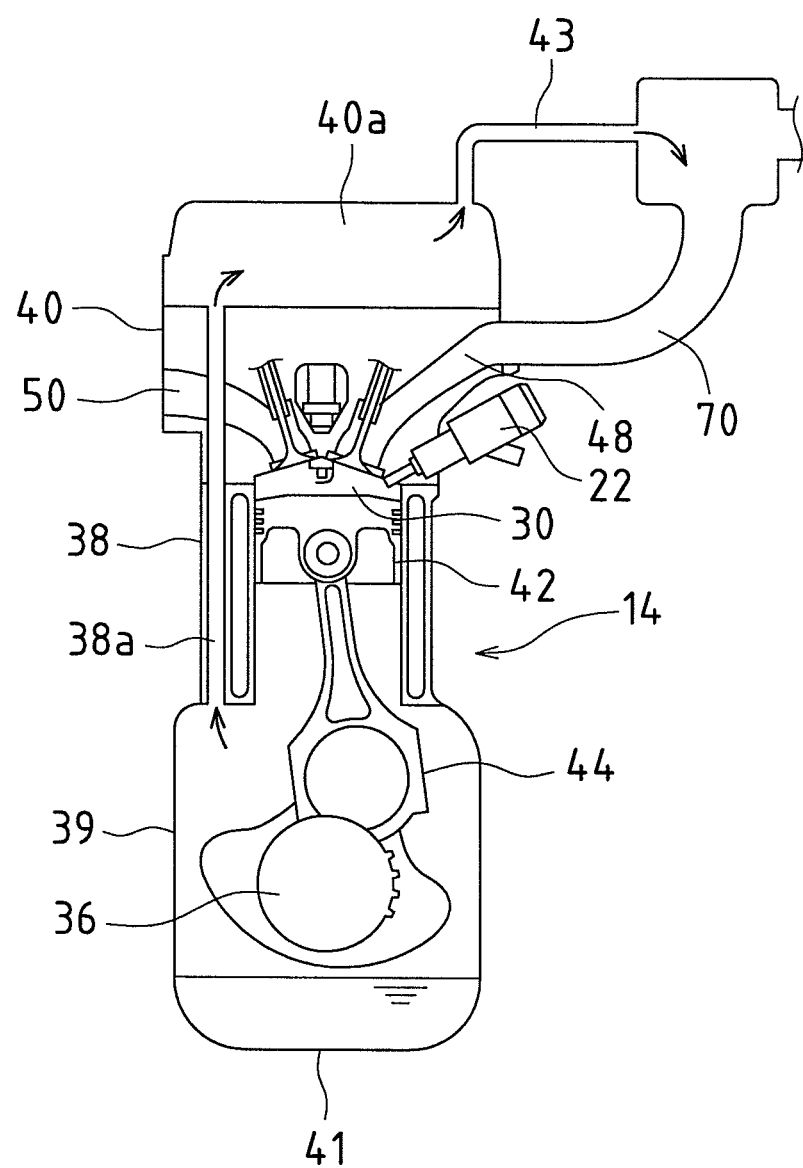
FIG. 2 is a diagram schematically showing a configuration of a blow-by gas channel, passages, and the like provided in the in-cylinder direct injection engine of FIG. 1.

FIG. 1 is a schematic configuration diagram showing an example of an in-cylinder direct injection engine 10 mounted in a vehicle to which a control device of the present invention is applied. FIG. 2 is a diagram schematically showing a configuration of a blow-by gas channel, passages, and the like provided in the in-cylinder direct injection engine 10.

The in-cylinder direct injection engine 10 in this example includes a fuel supply device 12, a multi-cylinder (in this example, an in-line four-cylinder) engine body 14, an intake system 16A connected to the engine body 14, an exhaust system 16B connected to the engine body 14, an ECU (Electric Control Unit) 18 that controls driving of the in-cylinder direct injection engine 10, and the like.

The fuel supply device 12 supplies fuel (e.g., gasoline) stored in a fuel tank 24 to the in-cylinder direct injection engine 10. The fuel supply device 12 is configured by injectors (fuel injection valves) 22, the fuel tank 24, a low-pressure fuel pump 26, a high-pressure fuel pump 28, a fuel supply pipe (not shown), and the like.

The injectors 22 are provided one each for each cylinder in the engine body 14. The injectors 22 are valves that directly inject fuel into combustion chambers 30 of the cylinders, and are supplied with fuel pressurized by the low-pressure fuel pump 26 and the high-pressure fuel pump 28. The fuel injection amount, injection timing, and the like of the injectors 22 are controlled by the ECU 18.

Fuel (e.g., gasoline) is stored in the fuel tank 24. The low-pressure fuel pump 26 pressurizes the fuel stored in the fuel tank 24. The high-pressure fuel pump 28 further pressurizes the fuel pressurized by the low-pressure fuel pump 26. The high-pressure fuel pump 28 is driven by, for example, a pump driving cam (not shown) provided on an intake camshaft 34 of a variable valve device 32. The intake camshaft 34 rotates in conjunction with the rotation of a crankshaft 36 of the in-cylinder direct injection engine 10.

The high-pressure fuel pump 28 is provided with an electromagnetic spill valve (not shown), and with use of the electromagnetic spill valve, the inflow amount of fuel (fuel pressurized by the low-pressure fuel pump 26) that is to flow into the high-pressure fuel pump 28 is adjusted, and also the pressure of fuel discharged from the high-pressure fuel pump 28 is adjusted. The driving of the electromagnetic spill valve of the high-pressure fuel pump 28 is controlled by the ECU 18.

The engine body 14 includes cylinder blocks 38, a crankcase 39, cylinder heads 40, an oil pan 41, pistons 42, connecting rods 44, the crankshaft 36, spark plugs 46, the variable valve device 32, and the like.

In each cylinder of the engine body 14, the combustion chamber 30 is formed by the piston 42, the cylinder block 38, and the cylinder head 40. An intake port 48 and an exhaust port 50 are formed in the cylinder head 40. The intake port 48 and the exhaust port 50 are connected to the combustion chamber 30 via an intake valve 54 and an exhaust valve 56 respectively, which are described later. Also, the intake port 48 and the exhaust port 50 are connected to an intake passage 70 and an exhaust passage 84 respectively, which are described later.

The piston 42 is coupled to the crankshaft 36, which is an output shaft, via the connecting rod 44. Reciprocating motion of the piston 42 (reciprocating motion due to the combustion of an air-fuel mixture (intake air+fuel) in the combustion chamber 30) is converted into rotation of the crankshaft 36 by the connecting rod 44.

A crank angle, which is the rotation angle of the crankshaft 36, is detected by a crank angle sensor 52. An output signal from the crank angle sensor 52 is input to the ECU 18. The ECU 18 determines the engine rotation speed of the in-cylinder direct injection engine 10 and makes a cylinder determination with respect to the cylinders based on the output signal from the crank angle sensor 52.

Also, the engine body 14 is provided with a knock sensor 90 that detects knocking of the engine body 14, an oil temperature sensor 92 that detects the temperature of the engine oil, and a water temperature sensor 94 that detects an engine water temperature (coolant temperature). Output signals from the knock sensor 90, the oil temperature sensor 92, and the water temperature sensor 94 are input to the ECU 18.

Furthermore, the spark plugs 46 are provided one each for each cylinder in the engine body 14. Each of the spark plugs 46 ignites according to an ignition signal from the ECU 18, and the air-fuel mixture in the combustion chambers 30 of the cylinders ignites and explodes due to the ignition of the spark plugs 46. Adjustment of the ignition timing of the spark plugs 46 (ignition timing retarding, advancing, and the like) is controlled by the ECU 18.

The crankcase 39 is provided on the bottom side of the cylinder blocks 38 of the engine body 14, and the oil pan 41 that stores engine oil is provided on the bottom side of the crankcase 39. During running of the in-cylinder direct injection engine 10, the engine oil stored in the oil pan 41 is drawn up by an oil pump via an oil strainer that removes foreign matter, then purified by an oil filter, and thereafter supplied to the pistons 42, the crankshaft 36, the connecting rods 44, and the like, and used to, for example, lubricate and cool various portions. Then, after being used to, for example, lubricate and cool various portions of the engine body 14, the engine oil supplied in this way is returned to the oil pan 41 and stored therein until again drawn up by the oil pump.

The cylinder heads 40 of the engine body 14 are provided with the variable valve device 32. The variable valve device 32 opens and closes the intake valves 54 and the exhaust valves 56. The variable valve device 32 is configured by the intake camshaft 34, an exhaust camshaft 58, an intake valve timing mechanism 60, and the like.

Each of the intake valves 54 is disposed between the intake port 48 and the combustion chamber 30. The intake valve 54 is driven so as to be opened and closed by the rotation of the intake camshaft 34, and the intake port 48 and the combustion chamber 30 are caused to be in communication or obstructed with respect to each other by the open/close driving of the intake valve 54. Also, each of the exhaust valves 56 is disposed between the exhaust port 50 and the combustion chamber 30. The exhaust valve 56 is driven so as to be opened and closed by the rotation of the exhaust camshaft 58, and the exhaust port 50 and the combustion chamber 30 are caused to be in communication or obstructed with respect to each other by the open/close driving of the exhaust valve 56.

The intake camshaft 34 and the exhaust camshaft 58 are coupled to the crankshaft 36 via a timing chain or the like, and rotate in conjunction with the rotation of the crankshaft 36.

The intake valve timing mechanism 60 is disposed between the intake camshaft 34 and the crankshaft 36. The intake valve timing mechanism 60 is a mechanism that continuously changes the rotation phase of the intake camshaft 34 with respect to the crankshaft 36.

An advanced angle chamber and a retarded angle chamber (neither of which is shown) are each formed inside the intake valve timing mechanism 60. Oil from oil control valves of the variable valve device 32 is supplied to either one of the advanced angle chamber and the retarded angle chamber. When oil is supplied to the advanced angle chamber of the intake valve timing mechanism 60, the rotation phase of the intake camshaft 34 with respect to the crankshaft 36 changes in the advanced angle direction. When oil is supplied to the retarded angle chamber of the intake valve timing mechanism

60, the rotation phase of the intake camshaft 34 with respect to the crankshaft 36 changes in the retarded angle direction. Due to the rotation phase of the intake camshaft 34 changing in this way, the open/close timing of the intake valves 54 changes to the advanced angle side or the retarded angle side. Accordingly, the advanced angle amount or retarded angle amount of the intake valves 54 can be adjusted.

Note that a spool valve is provided inside each of two oil control valves corresponding to the intake valve timing mechanism 60, and due to the movement of the spool valves, oil is selectively supplied to either one of the advanced angle chamber and the retarded angle chamber of the intake valve timing mechanism 60. Control of the positions of the two spool valves, that is to say, the open/close timing of the intake valves 54 is controlled by the ECU 18.

Also, the variable valve device 32 includes an intake cam position sensor 62 that detects the rotational position of the intake camshaft 34. An output signal from the intake cam position sensor 62 is input to the ECU 18. Note that although the variable valve device 32 in this example includes the intake valve timing mechanism 60 that adjusts the open/close timing of the intake valves 54, there is no limitation to this, and the variable valve device 32 may include, for example, an exhaust valve timing mechanism that adjusts the open/close timing of the exhaust valves 56.

Meanwhile, the intake system 16A is for drawing in air from the exterior, and guiding the drawn-in air to the combustion chamber 30 of each cylinder in the engine body 14. The intake system 16A includes an air cleaner 64, an air flow meter 66, a throttle valve 68, the intake passage 70 that is a communication passage from the air cleaner 64 to the intake port 48 of each cylinder, and the like.

The air cleaner 64 removes dust and the like contained in the intake air, and the air from which dust and the like has been removed (clean air) is introduced to the combustion chamber 30 of each cylinder via the intake passage 70 and the intake ports 48. The air flow meter 66 detects the volume of air (intake air volume) introduced to the combustion chamber 30 of each cylinder. An output signal from the air flow meter 66 is input to the ECU 18.

The throttle valve 68 is a valve that adjusts the intake air volume for the combustion chamber 30 of each cylinder, and is driven by an actuator 80, which is a stepping motor or the like. The throttle opening degree of the throttle valve 68 can be electronically controlled independently of accelerator pedal operations performed by the driver, and the control of the throttle valve opening degree, that is to say, drive control of the actuator 80 is performed by the ECU 18.

Also, the exhaust system 16B is configured by an exhaust gas purification catalyst (three-way catalyst) 82, a silencing device (not shown), the exhaust passage 84 that is a communication passage from the exhaust port 50 of each cylinder to the silencing device via the exhaust gas purification catalyst 82, and the like.

The exhaust gas purification catalyst 82 removes hazardous substances contained in the exhaust gas introduced via the exhaust passage 84. The exhaust gas from which hazardous substances have been removed by the exhaust gas purification catalyst 82 is discharged to the exterior via the silencing device and the like.

Also, disposed in the exhaust gas passage 84 positioned on the upstream side (upstream side with respect to the exhaust gas flow) of the exhaust gas purification catalyst 82 are an air-fuel ratio sensor (hereinafter, also called the "A/F sensor") 86 that detects the air-fuel ratio (hereinafter, also called the "A/F") of the exhaust gas discharged into the exhaust passage 84, and a temperature sensor 88 that detects the catalyst bed temperature of the exhaust gas purification catalyst 82. Output signals from the A/F sensor 86 and the temperature sensor 88 are input to the ECU 18.

Note that although the catalyst bed temperature of the exhaust gas purification catalyst 82 is directly detected by the temperature sensor 88 in this example, there is no limitation to this, and a configuration is possible in which the temperature of the exhaust gas at least either on the upstream side or downstream side of the exhaust gas purification catalyst 82 is detected by a temperature sensor, and the catalyst bed temperature of the exhaust gas purification catalyst 82 is estimated based on the detected temperature of the exhaust gas.

In this example, as shown in FIG. 2, a blow-by gas channel 38a is formed in the cylinder block 38 and the cylinder head 40 of the engine body 14, and blow-by gas that has leaked from the combustion chamber 30 into the crankcase 39 flows into a cylinder head chamber 40a through the blow-by gas channel 38a. Also, the cylinder head 40 is connected to a blow-by gas passage 43 that is in communication with the cylinder head chamber 40a. A tip portion of the blow-by gas passage 43 is in communication with the intake passage 70 on the downstream side (downstream side with respect to the intake air flow) of the throttle valve 68 (see FIG. 1).

Providing a blow-by gas reflux system configured by this kind of blow-by gas channel 38a, blow-by gas passage 43, and the like enables causing blow-by gas that has leaked from the combustion chambers 30 of the engine body 14 into the crankcase 39 to return to the intake passage 70 through the blow-by gas channel 38a, the cylinder head chamber 40a, and the blow-by gas passage 43 in the engine body 14, thus enabling the reburning of such gas.

—ECU—

The ECU 18 includes a CPU (Central Processing Unit) that performs calculations, a RAM (Random Access Memory) that stores various types of information such as calculation results, a backup RAM in which the storage content is held with use of a battery, a ROM (Read Only Memory) that stores various types of control programs and maps, and the like.

The ECU 18 receives an input of output signals from various types of sensors attached at various places in the vehicle in which the in-cylinder direct injection engine 10 is mounted. Specifically, the ECU 18 receives an input of signals indicating a crank angle detected by the crank angle sensor 52, an intake air volume detected by the air flow meter 66, an accelerator opening degree detected by an accelerator pedal sensor 8, an air-fuel ratio (A/F) detected by the A/F sensor 86, a catalyst temperature detected by the temperature sensor 88, knocking detected by the knock sensor 90, the temperature of engine oil (hereinafter, also called the "engine oil temperature") detected by the oil temperature sensor 92, an engine water temperature detected by the water temperature sensor 94, and the like.

Based on the output signals from the various types of sensors described above, the ECU 18 executes various types of control on the engine 10, including opening degree control on the throttle valve 68 of the in-cylinder direct injection engine 10, fuel injection amount control and injection timing control (open/close control on the injectors 22), and the like.

Furthermore, the ECU 18 executes "A/F feedback control", "processing for estimating amount of fuel diluted in oil", "processing for determining activity state of A/F sensor", "catalyst warm-up control", and the like that are described below.

The control device for a vehicle of the present invention is realized by programs executed by the above ECU 18.

—A/F Feedback Control—

The following describes A/F feedback control executed by the ECU 18.

First, in this example, exhaust gas from after the combustion of fuel in the in-cylinder direct injection engine 10 is purified as a result of the exhaust gas purification catalyst (three-way catalyst) 82 disposed in the exhaust passage 84 performing NOx reduction and the oxidation of CO and HC in the exhaust gas, thereby obtaining harmless $CO_2$, $H_2O$, and $N_2$. Such purification of the exhaust gas by the catalyst, that is to say, the NOx reduction and the oxidation of CO and HC is most effectively performed at the oxygen concentration that the catalyst atmosphere has when the combustion of an air-fuel mixture having a theoretical air-fuel ratio (e.g., 14.7) has been performed. In view of this point, in this example, the A/F feedback control is executed such that the actual air-fuel ratio of the in-cylinder direct injection engine 10 becomes the theoretical air-fuel ratio, if a predetermined execution condition is established.

Specifically, the fuel injection amount of the in-cylinder direct injection engine 10 is corrected so as to reduce a deviation between a target value (theoretical air-fuel ratio) and the actual air-fuel ratio calculated from the output signal from the A/F sensor 86 disposed in the exhaust passage 84 on the upstream side of the exhaust gas purification catalyst 82. In other words, the fuel injection amount is corrected to a lower amount if the actual air-fuel ratio obtained from the output signal from the A/F sensor 86 is a value on the rich side of the target value. On the other hand, the fuel injection amount is corrected to a higher amount if the actual air-fuel ratio obtained from the output signal from the A/F sensor 86 is a value on the lean side of the target value. By correcting the fuel injection amount to a higher or lower amount in this way, the actual air-fuel ratio of the in-cylinder direct injection engine 10 is controlled so as to become the theoretical air-fuel ratio.

—Processing for Estimating Amount of Fuel Diluted in Oil—

Firstly, in an in-cylinder direct injection engine, when fuel injected from the injectors is not sufficiently atomized (e.g., when the engine is cold), a large amount of fuel adheres to the inner circumferential surface of the cylinders, and this fuel mixes with the engine oil, whereby the engine oil becomes diluted with fuel. In this example, the amount of fuel diluted in oil is estimated in the ECU 18 with the object of reducing the influence of such dilution fuel (described in detail later).

Specifically, in consideration of the fact that the amount of fuel diluted in oil changes according to the cylinder temperature, which is correlated with the engine water temperature, in the ECU 18, the engine water temperature at the time of engine starting is obtained based on the output signal from the water temperature sensor 94, and the amount of fuel diluted in oil is estimated by referencing a map or the like based on the engine water temperature at the time of starting. The map used in the estimation processing is, for example, a map obtained by mapping values adapted through experimentation, simulation calculation, and the like, in consideration of the fact that as the cylinder temperature (engine water temperature) decreases, the amount of fuel that adheres to the inner circumferential surface of the cylinders (amount of fuel mixed in with engine oil) increases.

Note that in such processing for estimating the amount of fuel diluted in oil, a configuration is possible in which the evaporated amount (volatilized amount) of dilution fuel is estimated based on the engine water temperature, and the estimated amount of fuel diluted in oil is corrected using the estimated evaporated amount. Doing this enables more accurately estimating the amount of fuel diluted in oil.

Also, in the case in which a function is included for executing processing for sequentially storing and updating the amount of fuel diluted in oil (the amount of fuel accumulated in the engine oil when the engine is stopped) estimated based on a driving state history of the in-cylinder direct injection engine 10 in one trip from engine starting until stopping, a configuration is possible in which the most recent stored value (stored value of the amount of fuel diluted in oil) is reflected in the processing for estimating the amount of fuel diluted in oil.

Note that one example of another estimation method is estimation processing in which the oil dilution amount is estimated by referencing a map or the like based on an integrated value of the intake air volume (or fuel injection amount) and an elapsed time since engine starting (e.g., see the dilution fuel estimation processing disclosed in JP 2006-183539A).

—Processing for Determining Activity State of A/F Sensor—

The ECU 18 determines whether the A/F sensor 86 is in an active state. For example, the method proposed in JP 2004-132840A can be employed in this determination. Specifically, the resistance value (admittance: a value correlated with the element temperature) of a solid electrolyte element of the A/F sensor 86 is compared with a predetermined activity determination value (e.g., 40% of an admittance target value), and the A/F sensor 86 is determined to be in an active state if the admittance has reached the activity determination value. In contrast, if the admittance has not reached the activity determination value, the A/F sensory 86 is determined to be in an inactive state.

Note that whether the A/F sensor 86 is in the active state may be determined by, for example, estimating the element temperature of the A/F sensor 86 from the integrated value of the intake air volume (integrated value of the exhaust gas temperature) calculated from the output signal from the air flow meter 66, and comparing the element temperature with a determination value.

—Catalyst Warm-Up Control—

In this example, the ECU 18 executes catalyst warm-up control for realizing early warm-up of the exhaust gas purification catalyst 82 disposed in the exhaust passage 84.

Specifically, at the time of starting the in-cylinder direct injection engine 10 (e.g., when the engine is cold), the combustion state is caused to be stratified combustion (or weak stratified combustion) by setting the fuel injection timing to be in the compression stroke, and also the temperature of the exhaust gas discharged from the combustion chambers 30 is raised by retarding the ignition timing of ignition performed by the spark plugs 46. Executing such catalyst warm-up control enables accelerating the warm-up of the exhaust gas purification catalyst 82. Note that the engine output torque decreases when such catalyst warm-up control is executed, and therefore control is simultaneously performed in which the intake air volume is increased by controlling the opening degree of the throttle valve 68 in order to compensate for the decrease in torque.

Here, as described above, in an in-cylinder direct injection engine, when fuel injected from the injectors is not sufficiently atomized (e.g., when the engine is cold), a large amount of fuel adheres to the inner circumferential surface of the cylinders, and this fuel mixes with the engine oil, whereby the engine oil becomes diluted with fuel. As the temperature of the engine oil increases, the dilution fuel accumulated in the engine oil volatilizes (evaporates) in the crankcase. The volatilized fuel enters the intake passage through the blow-by gas passage and the like, and therefore the engine air-fuel ratio (the air-fuel ratio of the air-fuel mixture in the combustion chambers 30) becomes rich.

Although such a situation normally has little influence even if it occurs since the A/F feedback control is executed, there are cases in which a problem arises when catalyst warm-up control is performed in an in-cylinder direct injection engine. Specifically, stratified combustion (or weak stratified combustion) is being performed as described above when catalyst warm-up control is performed in an in-cylinder direct injection engine, and therefore the A/F feedback control is not executed in view of the difficulty in terms of spray formation. For this reason, when the engine air-fuel ratio becomes rich when catalyst warm-up control is performed, there are cases in which drivability and exhaust emissions degrade.

In consideration of this point, a technical feature of this example is that drivability and exhaust emissions are improved by prohibiting the catalyst warm-up control if a condition, such as the engine air-fuel ratio of the in-cylinder direct injection engine 10 becoming rich, is established.

Figure 3:
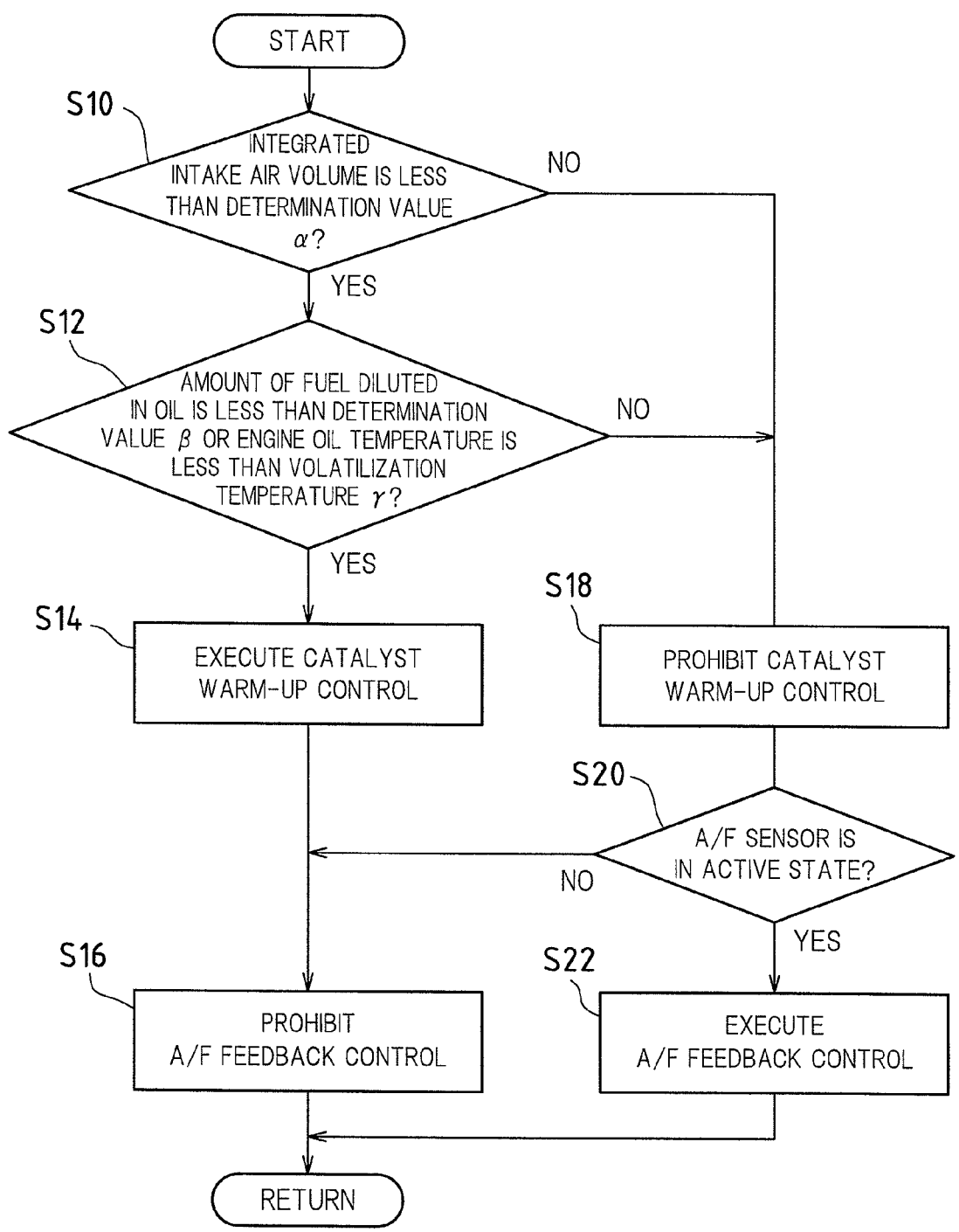
FIG. 3 is a flowchart showing an example of control executed by an ECU.

The following describes an example of catalyst warm-up control including such prohibition control with reference to the flowchart in FIG. 3.

The control routine in FIG. 3 is repeatedly executed at a predetermined cycle in the ECU 18. Note that in the execution of the control routine in FIG. 3, the ECU 18 successively executes the "processing for estimating amount of fuel diluted in oil", the "determination of activity state of A/F sensor", and the like that are described above.

The control routine in FIG. 3 is started along with the starting of the in-cylinder direct injection engine 10, and first in step S10, an integrated intake air volume since the time of engine starting is calculated based on an output signal from the air flow meter 66, and a determination is made as to whether the integrated intake air volume is less than a determination value $\alpha$.

Step S10 is a step for determining whether a condition in which catalyst warm-up control is required (a warm-up control required condition) is established, and if the integrated intake air volume is less than the determination value $\alpha$ (affirmative determination (YES) in step S10), the warm-up control required condition is determined to be established, and processing proceeds to step S12. If the integrated intake air volume is greater than or equal to the determination value $\alpha$ (negative determination (NO) in step S10), the warm-up control required condition is determined to not be established, and the catalyst warm-up control is prohibited (step S18). Thereafter, processing moves to step S20.

Here, in consideration of the intake air volume during idle running, the time required for completion of catalyst warm-up, and the like, the determination value $\alpha$ used in the determination of step S10 is set to a value (e.g., $\alpha$=200 g) adapted through experimentation, simulation calculation, and the like. Note that the determination value $\alpha$ may be set variably according to the engine water temperature at the time of engine starting.

In step S12, a determination is made as to whether the estimated amount of fuel diluted in oil, which was estimated through the above-described processing for estimating the amount of fuel diluted in oil, is less than a determination value $\beta$, and also a determination is made as to whether the engine oil temperature obtained from an output signal from the oil temperature sensor 92 is less than a volatilization temperature $\gamma$. If the determination result is that the estimated amount of fuel diluted in oil is less than the determination value $\beta$ or that the engine oil temperature is less than the volatilization temperature $\gamma$ (if the determination result of step S12 is an affirmative determination (YES)), the catalyst warm-up control is executed (step S14). In the case of executing the catalyst warm-up control, as described above, the exhaust temperature is raised by setting the fuel injection time to be in the compression stroke and retarding the ignition timing of the ignition performed by the spark plugs 46, and also the intake air volume is increased by controlling the opening degree of the throttle valve 68 in order to compensate for a decrease in torque. Thereafter, in step S16 the A/F feedback control is prohibited, and then processing returns.

On the other hand, if the determination result of step S12 is a negative determination (NO), that is to say, if the estimated amount of fuel diluted in oil is greater than or equal to the determination value $\beta$, and furthermore the engine oil temperature is greater than or equal to the volatilization temperature $\gamma$, the catalyst warm-up control is prohibited (step S18). Thereafter, processing moves to step S20.

In step S20, a determination is made as to whether the A/F sensor 86 is in the active state. If the determination result of step S20 is an affirmative determination (YES) (if the A/F sensor 86 is in the active state), the A/F feedback control is executed (step S22). Thereafter, processing returns. In contrast, if the determination result of step S20 is a negative determination (NO) (if the A/F sensor 86 is in the inactive state), the A/F feedback control is prohibited (step S16). Thereafter, processing returns.

The above control series is executed repeatedly from when the in-cylinder direct injection engine 10 is started until it is stopped.

Here, in the above-described determination processing of step S12, the determination value $\beta$ set for the estimated amount of fuel diluted in oil is a value adapted based on the result of obtaining, through experimentation, simulation calculation, and the like, a value (dilution fuel amount) at which exhaust emissions are not negatively influenced even if the dilution fuel accumulated in the engine oil at the time of the determination volatilizes (evaporates). Also, the volatilization temperature $\gamma$ set for the engine oil temperature is a value adapted based on the type of fuel used (e.g., $\gamma$=40° C. in the case of gasoline).

<Effects>

As described above, according to this example, in the case in which the warm-up control required condition is established (in the case in which the integrated intake air volume is less than the determination value $\alpha$), if the estimated amount of fuel diluted in oil is low (if less than the determination value $\beta$), or even if the amount of fuel diluted in oil is high, when the engine oil temperature is less than the volatilization temperature $\gamma$ of the fuel, the situation is such that exhaust emissions will not be negatively influenced, and therefore the catalyst warm-up control is executed.

In contrast, even in the case in which the warm-up control required condition is established, if the amount of fuel diluted in oil is greater than or equal to the determination value $\beta$, and furthermore the temperature of the engine oil is greater than or equal to the volatilization temperature $\gamma$, the engine air-fuel ratio becomes rich, and there is the possibility of negative influencing the exhaust emissions, and therefore the catalyst warm-up control is prohibited. In other words, in the case in which the estimated amount of fuel diluted in oil is high, the catalyst warm-up control is prohibited if the engine oil temperature is in a high region (volatilization temperature region), thus causing a return to the state of normal injection in which the A/F feedback control can be executed, and accordingly drivability and exhaust emissions are improved.

Embodiment 2

Figure 4:
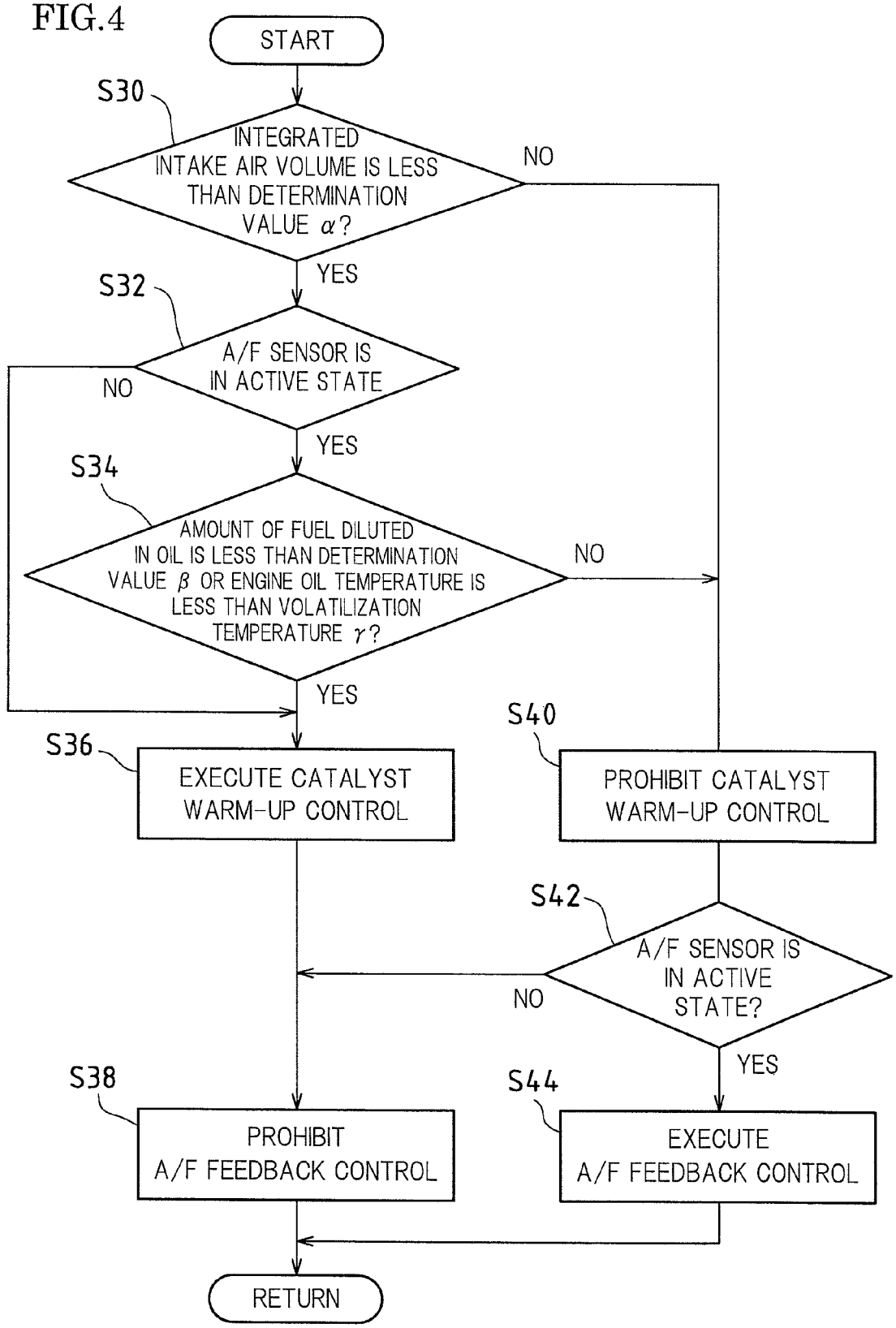
FIG. 4 is a flowchart showing another example of control executed by the ECU.

Below is a description of another embodiment of the present invention with reference to FIG. 4. FIG. 4 is a flowchart showing another example of control executed by the ECU 18.

A feature of this example is that in the case in which the warm-up control required condition is established, that is to say, in the case in which the integrated intake air volume is less than the determination value α, a determination is made as to whether the condition "estimated amount of fuel diluted in oil is less than predetermined value, or engine oil temperature is less than predetermined value" is established only if the A/F sensor 86 has been determined to be in the active state, and other aspects of the configuration are similar to "Embodiment 1" described above.

The following describes the control in this example through each step in FIG. 4. Note that in the execution of the control routine in FIG. 4, the ECU 18 successively executes the "processing for estimating amount of fuel diluted in oil", the "determination of activity state of A/F sensor", and the like that have been described above.

The control routine in FIG. 4 is started along with the starting of the in-cylinder direct injection engine 10, and first in step S30, a determination is made as to whether the integrated intake air volume is less than the determination value α. The determination processing in step S30 is similar to the processing in step S10 of "Embodiment 1" described above, and therefore a detailed description thereof has been omitted.

If the determination result of step S30 is a negative determination (NO) (if the integrated intake air volume is greater than or equal to the determination value α), the warm-up control required condition is determined to not be established, and the catalyst warm-up control is prohibited (step S40). Thereafter, processing moves to step S42. On the other hand, if the determination result of step S30 is an affirmative determination (YES) (if the integrated intake air volume is less than the determination value α), the warm-up control required condition is determined to be established, and processing moves to step S32.

In step S32, a determination is made as to whether the A/F sensor 86 is in the active state. If the determination result of step S32 is a negative determination (NO) (if the A/F sensor 86 is in the inactive state), processing moves to step S36. If the determination result of step S32 is an affirmative determination (YES) (if the A/F sensor 86 is in the active state), processing moves to step S34.

In step S34, a determination is made as to whether the estimated amount of fuel diluted in oil is less than the determination value β or the engine oil temperature is less than the volatilization temperature γ. The determination processing in step S34 is similar to the processing in step S12 of "Embodiment 1" described above, and therefore a detailed description thereof has been omitted. If the determination result of step S34 is an affirmative determination (YES), processing moves to step S36.

In step S36, the catalyst warm-up control is executed, then the A/F feedback control is prohibited in step S38, and thereafter processing returns. Note that the catalyst warm-up control executed in step S36 is similar to the processing in step S14 of "Embodiment 1" described above, and therefore a detailed description thereof has been omitted.

On the other hand, if the determination result of step S34 is a negative determination (NO) (if the estimated amount of fuel diluted in oil is greater than or equal to the setting value β, and furthermore the engine oil temperature is greater than or equal to the volatilization temperature γ), the catalyst warm-up control is prohibited (step S40). Thereafter, processing moves to step S42.

In step S42, a determination is made as to whether the A/F sensor 86 is in the active state. If the determination result of step S42 is an affirmative determination (YES) (if the A/F sensor 86 is the active state), the A/F feedback control is executed (step S44). Thereafter, processing returns. On the other hand, if the determination result of step S42 is a negative determination (NO) (if the A/F sensor 86 is in the inactive state), the A/F feedback control is prohibited (step S38). Thereafter, processing returns.

The above control series is executed repeatedly from when the in-cylinder direct injection engine 10 is started until it is stopped.

<Effects>

According to this example, the following effects are achieved in addition to effects similar to those in "Embodiment 1" described above.

In this example, in the case in which the integrated intake air volume is less than the determination value α (in the case in which the warm-up control required condition is established), a determination is made as to whether the condition "estimated amount of fuel diluted in oil is less than determination value β, or engine oil temperature is less than volatilization temperature γ" is established only if the A/F sensor 86 has been determined to be in the active state. In other words, the prohibition of the catalyst warm-up control is limited to the state in which the A/F sensor 86 is active and the A/F feedback control can be executed. For this reason, exhaust emissions are further improved by prohibiting the catalyst warm-up control.

Other Embodiments

Although the warm-up control required condition is "the integrated intake air volume since the time of engine starting is less than the determination value α" in the above examples, the present invention is not limited to this. For example, the warm-up control required condition may be "the engine water temperature at the time of engine starting obtained from the output signal from the water temperature sensor 94 is less than the predetermined determination value", or "the oil temperature at the time of engine starting obtained from the output signal from the oil temperature sensor 92 is less than the predetermined determination value".

Although a determination is made as to whether the estimated amount of fuel diluted in oil is less than the determination value (less than the volatilization temperature) in step S12 of FIG. 3 and step S34 of FIG. 4 in the above examples, the present invention is not limited to this. For example, execution/prohibition of the catalyst warm-up control may be controlled by estimating a degree of oil dilution (dilution rate), which is a value related to the amount of fuel diluted in oil, and determining whether the estimated degree of oil dilution is less than a determination value (e.g., 5%). Also, the amount of fuel diluted in oil or the degree of oil dilution may be estimated values as described above, or may be measured values that have been measured with use of a known measurement device (e.g., a device employing a concentration meter, a viscosity meter, or the like) or the like.

Note that one example of a parameter related to the amount of fuel diluted in oil is an air-fuel ratio (A/F) learning value, and with use thereof, for example, a deviation between an A/F high load learning value and an A/F low load learning value may be used as a condition for determining execution/prohibition of the catalyst warm-up control.

Although a determination is made as to whether the engine oil temperature is less than the volatilization temperature γ (determination value) in step S12 of FIG. 3 and step S34 of FIG. 4 in the above examples, instead execution/prohibition of the catalyst warm-up control may be controlled by recognizing the engine water temperature, which is a value related to the engine oil temperature, from the output signal of the water temperature sensor 94, and determining whether the engine water temperature is less than a predetermined determination value.

Also, besides the oil temperature detection value detected by the oil temperature sensor 92, the engine oil temperature may be, for example, an estimated engine oil temperature estimated from the engine water temperature at the time of engine starting, or an estimated engine oil temperature estimated from the integrated intake air volume and the engine water temperature at the time of engine starting.

Note that one example of a parameter related to the engine oil temperature (volatilization of dilution fuel) is the air-fuel ratio, and with use thereof, for example, execution/prohibition of the catalyst warm-up control may be controlled by determining whether the air-fuel ratio obtained from the output signal from the A/F sensor 86 is rich (e.g., whether the air-fuel ratio is less than or equal to "10").

Although examples in which the present invention is applied to the control of a vehicle in which an in-cylinder direct injection engine is mounted have been given in the above examples, the present invention is not limited to this, and the present invention is applicable to the control of a vehicle in which a so-called dual injection type of engine is mounted, which includes an injector for in-cylinder injection that injects fuel into a cylinder (into a combustion chamber), and an injector for intake port injection that injects fuel into an intake passage or an intake port. Below is a description of this.

First, in a dual injection type of engine as well, when the engine is cold for example, catalyst warm-up control for accelerating the warm-up of the catalyst is performed by raising the temperature of exhaust gas discharged from the combustion chambers as a result of setting the fuel injection timing of the injectors for in-cylinder injection to be in the compression stroke to cause the combustion state to be stratified combustion (or weak stratified combustion), and furthermore retarding the ignition timing of ignition performed by the spark plugs, and therefore a similar problem to that of the in-cylinder direct injection engine described above occurs, that is to say, when the engine air-fuel ratio becomes rich when the catalyst warm-up control is executed due to the volatilization of dilution fuel mixed in with the engine oil, there is the problem that there are cases in which drivability and exhaust emissions degrade.

In order to solve such a problem, similar control to that of "Embodiment 1" described above is executed in a vehicle in which a dual injection type of engine is mounted as well. Specifically, in the case in which the warm-up control required condition is established (in the case in which the integrated intake air volume is less than the determination value α), if the estimated amount of fuel diluted in oil is low (if less than the determination value β), or even if the amount of fuel diluted in oil is high, when the engine oil temperature is less than the volatilization temperature γ of the fuel, the catalyst warm-up control is executed, thus accelerating the warm-up of the catalyst.

In contrast, control is executed in which even in the case in which the warm-up control required condition is established, if the amount of fuel diluted in oil is greater than or equal to the determination value β, and furthermore the temperature of the engine oil is greater than or equal to the volatilization temperature γ, the catalyst warm-up control is prohibited, thus improving drivability and exhaust emissions.

Also, in the case of a vehicle in which a dual injection type of engine is mounted as well, similarly to "Embodiment 2" described above, the prohibition of the catalyst warm-up control may be limited to the state in which the A/F sensor 86 is active and the A/F feedback control can be executed.

Although examples in which the present invention is applied to the control of a vehicle in which an inline type of engine is mounted are given in the above examples, the present invention is not limited to this, and the present invention is applicable to the control of a vehicle in which a V-type of engine, a horizontally-opposed type of engine, or the like is mounted. Also, there are no particular limitations on the engine specifications, such as the number of cylinders. Furthermore, the present invention is also applicable to the control of various types of vehicles such as an FR (Front-engine, Rear-drive) vehicle, an FF (Front-engine, Front-drive) vehicle, and a four-wheel drive vehicle.

INDUSTRIAL APPLICABILITY

The present invention is applicable to the control of a vehicle having mounted therein an in-cylinder direct injection engine or dual injection type of engine including an injector that directly injects fuel into a cylinder, and more specifically is applicable to the control of a vehicle in which warm-up control is performed on a catalyst disposed in an exhaust passage of the engine.

REFERENCE SIGNS LIST 10 in-cylinder direct injection engine
14 engine body
18 ECU
22 injector
38 cylinder block
38a blow-by gas channel
39 crankcase
40 cylinder head
40a cylinder head chamber
43 blow-by gas passage
46 spark plug
66 air flow meter
70 intake passage
82 exhaust gas purification catalyst (three-way catalyst)
84 exhaust passage
86 A/F sensor (air-fuel ratio sensor)
92 oil temperature sensor
94 water temperature sensor

The invention claimed is:
1. A control device for a vehicle, the control device being applied to a vehicle that comprises an internal combustion engine, an injector that directly injects fuel into a combustion chamber of the internal combustion engine, and a catalyst disposed in an exhaust passage of the internal combustion engine, the control device performing catalyst warm-up control on the catalyst, and the control device comprising:
an electronic control unit, including executable program logic, configured to perform:
determining whether a warm-up control required condition is met;
recognizing a parameter indicating an amount of fuel diluted in oil, contained in engine oil diluted by fuel;

recognizing a parameter indicating a temperature of the engine oil;

and controlling execution/prohibition of the catalyst warm-up control, wherein when the warm-up control required condition is met, the electronic control unit determines whether the parameter indicating the amount of fuel diluted in oil is less than a determination value, and whether the parameter indicating the temperature of the engine oil is less than a determination value, wherein the electronic control unit executes the catalyst warm-up control if the parameter indicating the amount of fuel diluted in oil is less than the determination value, or if the parameter indicating the temperature of the engine oil is less than the determination value, and wherein the electronic control unit prohibits the catalyst warm-up control if the parameter indicating the amount of fuel diluted in oil is greater than or equal to the determination value, and the parameter indicating the temperature of the engine oil is greater than or equal to the determination value.

2. The control device for a vehicle according to claim 1, comprising:

an air-fuel ratio sensor disposed in the exhaust passage of the internal combustion engine; and the electronic control unit including the executable program logic further configured to perform determining whether the air-fuel ratio sensor is in an active state, wherein when the electronic control unit prohibits the catalyst warm-up control and determines that the air-fuel ratio sensor is in the active state, the electronic control unit executes air-fuel ratio feedback control.

3. The control device for a vehicle according to claim 1, comprising:

an air-fuel ratio sensor disposed in the exhaust passage of the internal combustion engine; and the electronic control unit determines whether the air-fuel ratio sensor is in an active state, wherein if the electronic control unit determines that the air-fuel ratio sensor is in the active state in when the warm-up control required condition is met, the electronic control unit determines whether the parameter indicating the amount of fuel diluted in oil is less than the determination value or whether the parameter indicating the engine oil temperature is less than the determination value.

4. The control device for a vehicle according to claim 3, wherein, when the warm-up control required condition is met, the electronic control unit executes the catalyst warm-up control if the air-fuel ratio sensor is in an inactive state, wherein, when the warm-up control required condition is established, the electronic control unit executes the catalyst warm-up control if the air-fuel ratio sensor is in the active state while, the parameter indicating the amount of fuel diluted in oil is less than the determination value or while the parameter indicating the temperature of the engine oil is less than the determination value, and wherein, when the warm-up control required condition is established, the electronic control unit prohibits the catalyst warm-up control if the air-fuel ratio sensor is in the active state while the parameter indicating the amount of fuel diluted in oil is greater than or equal to the determination value, and the parameter indicating the temperature of the engine oil is greater than or equal to the determination value.

5. The control device for a vehicle according to claim 3, wherein when the controlling unit prohibits the catalyst warm-up control and determines that the air-fuel ratio sensor is in the active state, the electronic control unit executes air-fuel ratio feedback control.

6. The control device for a vehicle according to claim 1, wherein the electronic control unit determines that the warm-up control required condition is met when an integrated intake air volume since a time of engine starting is less than a determination value.

7. The control device for a vehicle according to claim 1, wherein the electronic control unit determines executing/prohibition of the catalyst warm-up control using the temperature of the engine oil itself as the parameter indicating the temperature of the engine oil, and using a fuel volatization temperature as the determination value.

* * * * *